(12) United States Patent
Dunnam et al.

(10) Patent No.: US 8,443,303 B2
(45) Date of Patent: May 14, 2013

(54) GESTURE-BASED NAVIGATION

(75) Inventors: Daniel S. Dunnam, Brooklyn, NY (US); Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 657 days.

(21) Appl. No.: 12/341,670

(22) Filed: Dec. 22, 2008

(65) Prior Publication Data

US 2010/0162180 A1    Jun. 24, 2010

(51) Int. Cl.
*G06F 3/033* (2006.01)
*G06F 3/01* (2006.01)
*G06F 3/00* (2006.01)
*G06F 3/048* (2006.01)
*G06F 3/041* (2006.01)

(52) U.S. Cl.
USPC ........... 715/863; 715/702; 715/752; 715/854; 345/173

(58) Field of Classification Search .................. 715/863, 715/854, 841, 829, 752; 345/173; 716/863
See application file for complete search history.

(56) References Cited

U.S. PATENT DOCUMENTS

| 6,340,979 | B1 * | 1/2002 | Beaton et al. .................. 715/764 |
| 2008/0052945 | A1 * | 3/2008 | Matas et al. ..................... 34/173 |
| 2008/0094369 | A1 * | 4/2008 | Ganatra et al. ................ 345/173 |
| 2009/0007017 | A1 * | 1/2009 | Anzures et al. ............... 715/835 |
| 2009/0064055 | A1 * | 3/2009 | Chaudhri et al. ............. 715/863 |
| 2009/0100380 | A1 * | 4/2009 | Gardner et al. ............... 715/854 |
| 2009/0199130 | A1 * | 8/2009 | Tsern et al. ................... 715/810 |
| 2009/0228807 | A1 * | 9/2009 | Lemay .......................... 715/752 |
| 2009/0278806 | A1 * | 11/2009 | Duarte et al. ................. 345/173 |
| 2010/0095240 | A1 * | 4/2010 | Shiplacoff et al. ............ 715/784 |

* cited by examiner

*Primary Examiner* — Tadeese Hailu
*Assistant Examiner* — Nicholas Ulrich

(57) ABSTRACT

A method includes detecting an area of a touch screen that is touched by an instrument and determining a gesture corresponding to the area touched. The method further includes performing a crossover operation when it is determined that the gesture corresponds to a crossover gesture and displaying on the touch screen a content that includes a first child content and a second child content that is associated with the crossover operation, where the crossover operation includes navigating between the first child content to the second child content in response to the crossover gesture. The first child content is accessible via a first parent content and the second child content is accessible via a second parent content, and when navigating between the first child content to the second child content, the first parent content and the second parent content is not displayed.

18 Claims, 5 Drawing Sheets

GESTURE-BASED NAVIGATION

BACKGROUND

With the development of touch screens or touch-based displays, users may interact with a variety of user devices, such as, for example, mobile phones, personal digital assistants (PDAs), web browsing devices, navigation devices, and/or other types of touch-sensitive devices. For example, a user may perform various gestures on a touch screen to input or navigate through content displayed.

DETAILED DESCRIPTION OF PREFERRED EMBODIMENTS

The following detailed description refers to the accompanying drawings. The same reference numbers in different drawings may identify the same or similar elements.

The term "component," as used herein, is intended to be broadly interpreted to include hardware, or a combination of hardware and software.

The term "device," as used herein, is intended to be broadly interpreted to include an apparatus that includes one or more components.

The terms "parent" or "directory," as used herein, are intended to be broadly interpreted to include a root of a path in which data, an application, etc., may be structured and/or accessed. For example, in a graphical user interface (GUI) on a device, a parent may correspond to an icon, an object, a group of files, a file, data, an application, or any visual content or information displayed. The parent may have a hierarchical relationship with a child. For example, in terms of navigating (e.g., within a GUI) on a device, a user may access a child via an access through a parent. It will be appreciated that the depth of access from the parent to the child may include a single link or multiple links. It will also be appreciated that a parent may be considered a child depending on the level of access, navigation, etc.

The terms "child" or "sub-directory," as used herein, are intended to be broadly interpreted to include a path in which data, an application, etc., may be structured and/or accessed. For example, in a GUI on a device, a child may correspond to an icon, an object, a group of files, a file, data, an application, or any visual content or information displayed. The child may have a hierarchical relationship with a parent. It will be appreciated that a child may be considered a parent depending on the level of access, navigation, etc.

The concepts described herein relate to providing a gesture-based navigation through content displayed on a touch screen. The gesture-based navigation may permit a user to access between sub-directories or children associated with different directories or parents, with a gesture. That is, instead of the user having to navigate back from a sub-directory or child to the associated directory or parent, select a different directory or parent and navigate to a different sub-directory or child, the user may navigate between sub-directories or children, with one gesture. Further, in accordance with the concepts described herein, other forms of gestures and corresponding functionality will be described.

Figure 1:
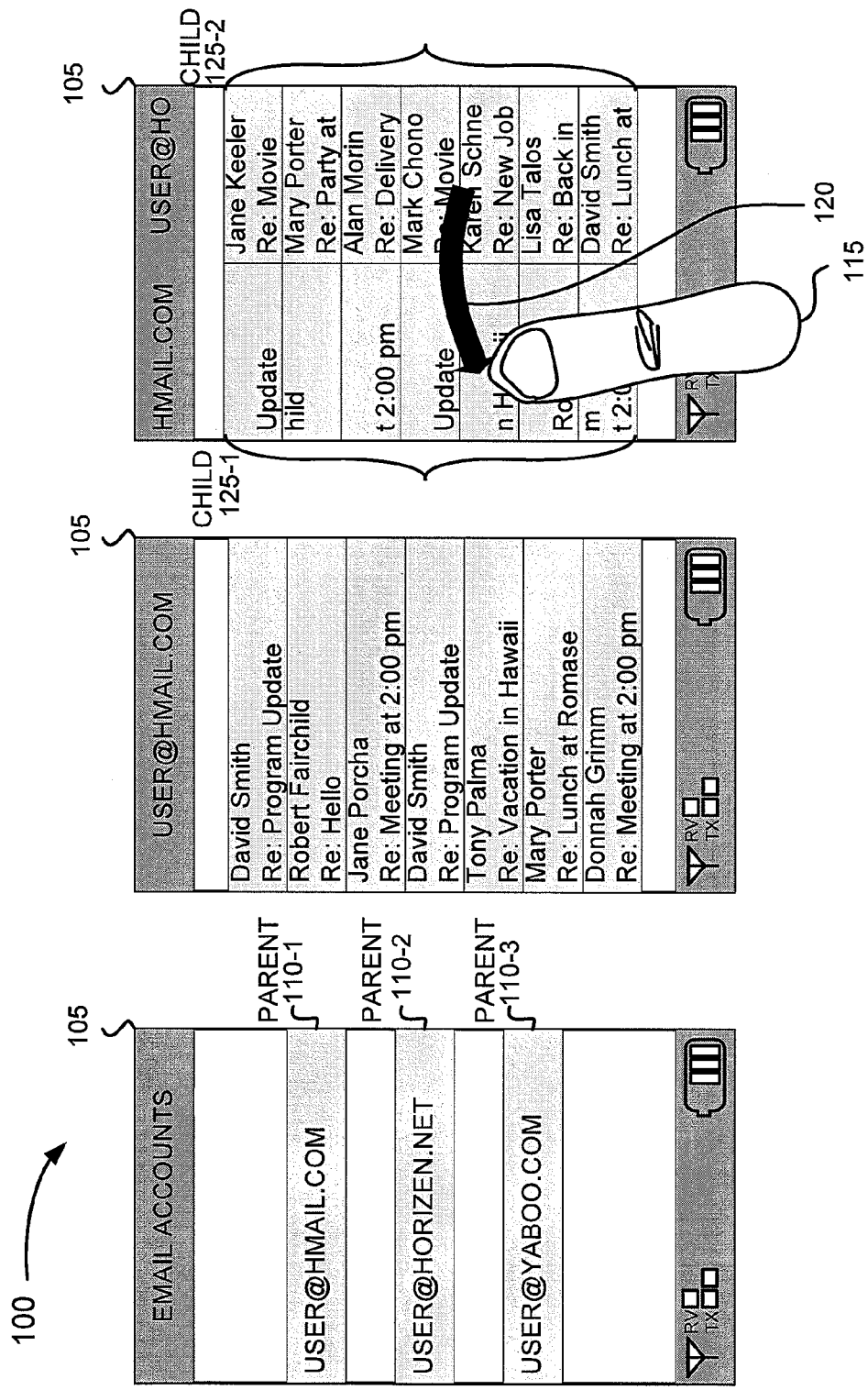
FIGS. 1A-1C are diagrams illustrating concepts described herein.

FIGS. 1A-1C are diagrams illustrating concepts described herein. As illustrated in FIG. 1A, a display 105 (e.g., a touch-screen display) may display content to a user (not illustrated). By way of example, the content may include a list of e-mail accounts, such as, for example, user@hmail.com, user@horizen.net, and user@yaboo.com. In this example, each of the e-mail accounts may be considered a parent or a directory (illustrated as parent 110-1, 110-2, and 110-3, respectively). For purposes of discussion, assume that the user wishes to view e-mails from his/her user@hmail.com e-mail account. The user may select the user@hmail.com e-mail account by touching display 105 with, for example, the user's finger or a stylus. FIG. 1B illustrates the content displayed on display 105 after the user@hmail.com e-mail account has been selected.

Turning to FIG. 1C, assume that the user wishes to view e-mails from another e-mail account (e.g., user@horizen.net). By way of example, a user's finger 115 may perform a gesture 120 to navigate from the e-mails of the user@hmail.com e-mail account to the e-mails of the user@horizen.net e-mail account. In this example, the e-mails associated with the user@hmail.com email account and the e-mails associated with the user@horizon.net email account may be considered children (as illustrated child 125-1 and child 125-2, respectively). While gesture 120 is illustrated as a flicking gesture (e.g., sliding a user's finger across display 105), in other implementations, gesture 120 may correspond to a different gesticulation (e.g., a single point gesture, a multipoint gesture, a static gesture, etc.).

As a result of the foregoing, a user's experience may be significantly enhanced by minimizing the number of interactions by the user to navigate through content. Since concepts have been broadly described, variations to the above concepts will be discussed further below.

Figure 2:
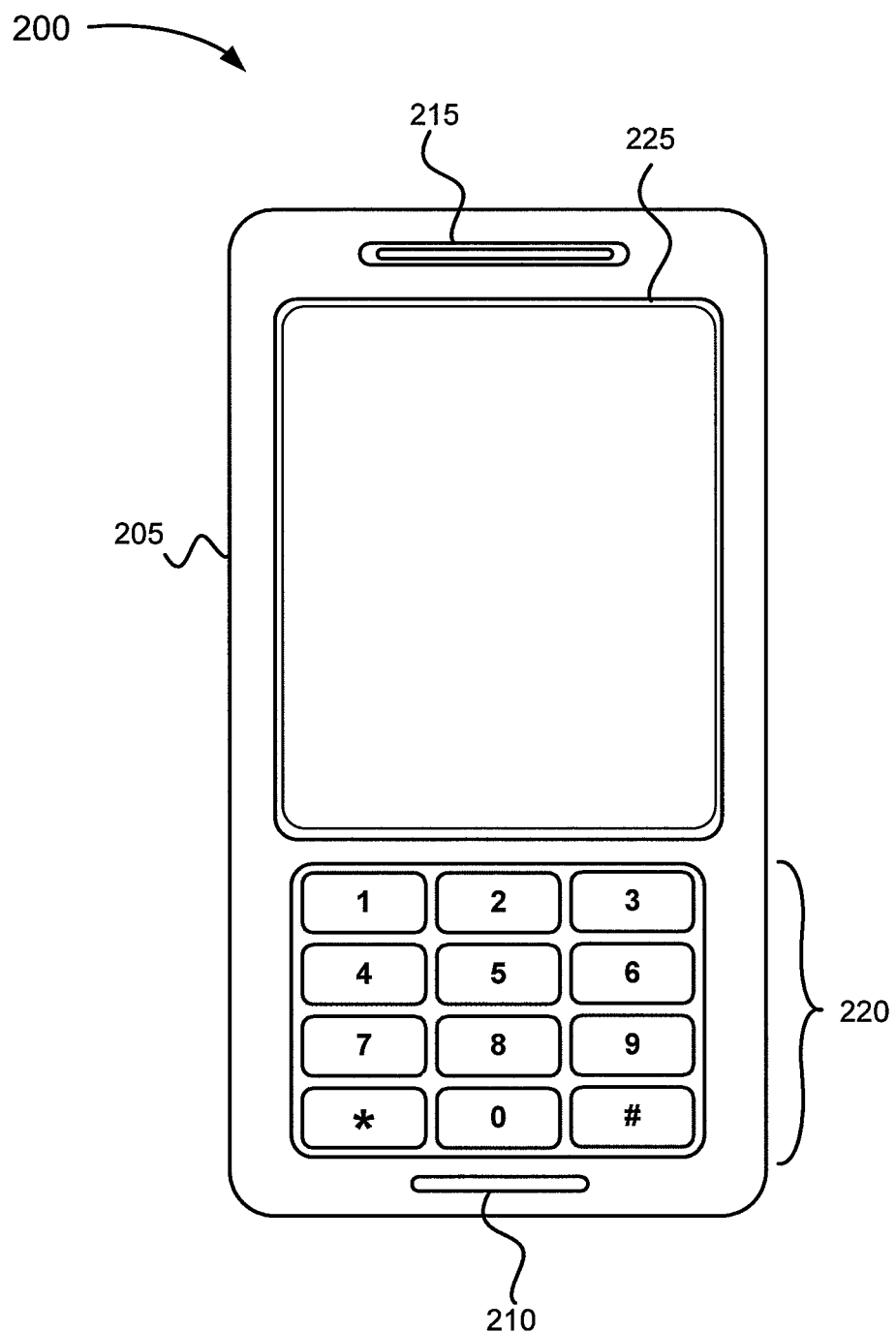
FIG. 2 is a diagram of an exemplary user device in which the concepts described herein may be implemented.

FIG. 2 is a diagram of an exemplary user device 200 in which the concepts described herein may be implemented. User device 200 may include a device with communication capability. In other embodiments, user device 200 may not include a device with communication capability. By way of example, user device 200 may include a wireless telephone, a paging device, a computational device (e.g., a computer), a PDA, a web browsing device, an Internet-based device, a personal communication systems (PCS) device, a kiosk device, a pervasive computing device, a gaming device, a music-playing device, a video-playing device, a vehicle-based device, and/or some other type of portable, stationary, or handheld device. User device 205 may include a variety of applications, such as, for example, an e-mail application, a telephone application, a camera application, a multi-media application, a music player application, an instant messaging application, a web browsing application, a blogging application and/or other types of applications (e.g., word processing application, etc.).

As illustrated in FIG. 2, an exemplary user device 200 may include a housing 205, a microphone 210, a speaker 215, a keypad 220, and a display 225. In other embodiments, user device 200 may include fewer, additional, and/or different components, or a different arrangement or configuration of components than those illustrated in FIG. 2 and described herein.

Housing 205 may include a structure to contain components of device 200. For example, housing 205 may be formed from plastic, metal, or some other material. Housing 205 may support microphone 210, speaker 215, keypad 220, and display 225.

Microphone 210 may transduce a sound wave to a corresponding electrical signal. For example, a user may speak into microphone 210 during a telephone call or to execute a voice command. Speaker 215 may transduce an electrical signal to a corresponding sound wave. For example, a user may listen to music or listen to a calling party through speaker 215.

Keypad 220 may provide input to device 200. Keypad 220 may include a standard telephone keypad, a QWERTY keypad, and/or some other type of keypad. Keypad 220 may also include one or more special purpose keys. In one implementation, each key of keypad 220 may be, for example, a push-button. A user may utilize keypad 220 for entering information, such as text or activating a special function.

Display 225 may output visual content and operate as an input component. By way of example, display 225 may include a liquid crystal display (LCD), a plasma display panel (PDP), a field emission display (FED), a thin film transistor (TFT) display, or some other type of display technology. Display 225 may display, for example, text, images, and/or video information to a user.

Display 225 includes a touch-sensitive screen. Display 225 may correspond to a single-point input device (e.g., capable of sensing a single touch) or a multipoint input device (e.g., capable of sensing multiple touches that occur at the same time). Display 225 may implement, for example, a variety of sensing technologies, including but not limited to, capacitive sensing, surface acoustic wave sensing, resistive sensing, optical sensing, pressure sensing, etc.

Figure 3:
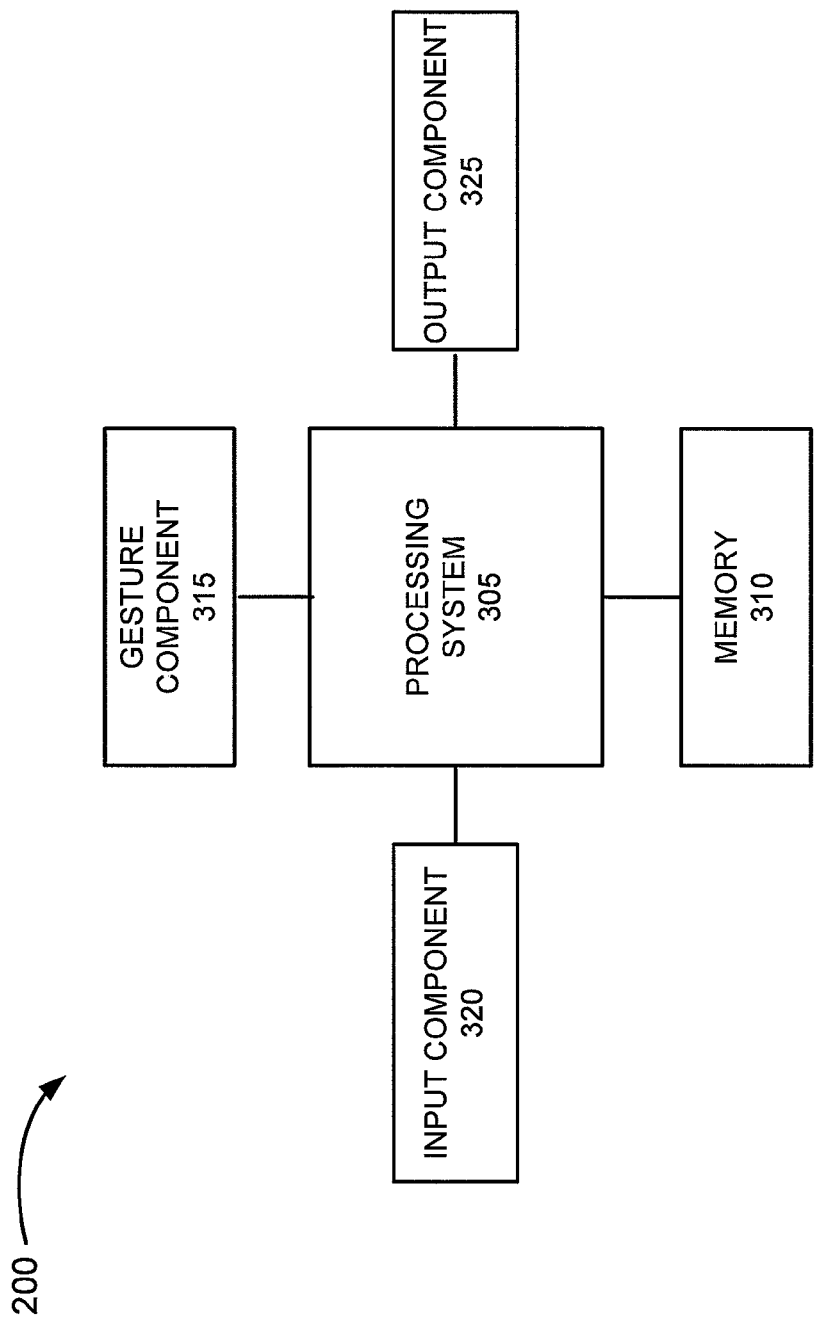
FIG. 3 is a diagram illustrating exemplary components of the user device.

FIG. 3 is a diagram illustrating exemplary internal components of user device 200. As illustrated, user device 200 may include a processing system 305, a memory 310, a gesture component 315, an input component 320, and an output component 325.

Processing system 305 may interpret and/or execute instructions and/or data. For example, processing system 305 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and/or execute instructions and/or data.

Memory 310 may store data, an application, and/or instructions related to the operation of user device 200. For example, memory 310 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), a flash memory, some other type of storage component, etc.

Gesture component 315 may determine a gesture based on the area(s) touched on display 225. Gesture component 315 may determine an operation to perform based on the determined gesture. For example, a user's gestures may be interpreted as commands for performing particular operations. By way of example, operations may include making a selection, entering, paging, scrolling, zooming, rotating, expanding a view, collapsing a view, etc. Additionally, as described herein, gesture component 315 may interpret a user's gesture(s) to perform operations according to the concepts described herein. For example, gesture component 315 may interpret a user's gesture to permit navigation between sub-directories or children associated with different directories or parents. In other implementations, gesture component 315 may interpret a user's gesture to permit navigation between sub-directories or children associated with the same directory or the same parent.

The instrument involved in a gesture may include a user's hand, finger(s), fingernail(s), or some other type of instrument (e.g., a stylus). As previously mentioned, a gesture may include a variety of actions, such as, for example, a single-point gesture or a multipoint gesture. Single-point gestures and multipoint gestures may each include, for example, continuous movement gestures (e.g., sliding across display 225), static gestures (e.g., tapping), multi-gestures (e.g., a sequence of strokes), etc. Additionally, a gesture may include, in addition, to touch, other parameters (e.g., pressure, etc.).

Input component 320 may permit a user and/or another component to input information in user device 200. For example, input component 320 may include a keyboard, a keypad 220, display 225, a touchpad, a mouse, a button, a switch, a microphone, an input port, voice recognition logic, and/or some other type of visual, auditory, etc., input component. Output component 325 may permit user device 200 to output information to a user and/or another component. For example, output component 325 may include display 225, a speaker 215, one or more light emitting diodes (LEDs), an output port, a vibrator, and/or some other type of visual, auditory, tactile, etc., output component.

Although FIG. 3 illustrates exemplary components, in other implementations, user device 200 may include additional, fewer, or different components, or differently arranged components. For example, user device 200 may include a communication interface (e.g., a radio interface, a coaxial interface, etc.) to enable user device 200 to communicate with other device(s) and/or network(s). Additionally, or alternatively, user device 200 may include a hard disk (e.g., a magnetic disk, an optical disk, a magneto-optic disk, etc.) or another type of computer-readable medium, along with a corresponding drive. The term "computer-readable medium" is intended to be broadly interpreted to include a physical memory or a logical memory. Logical memory may, for example, refer to a memory space within a single physical memory or disbursed across multiple physical memories. Additionally, or alternatively, it will be appreciated that, in other implementations, one or more operations described as being performed by a component, may be implemented by one or more other components, in addition to, or instead of, the component.

As previously described in relation to FIGS. 1A-1C, the concepts described herein relate to providing a gesture-based navigation through content displayed on a touch screen. The gesture-based navigation may permit a user to access between sub-directories or children associated with different directories or parents, with one gesture. By way of example, as previously described, a user may access between e-mails associated with different e-mail accounts. In other instances, these concepts may be applied to other types of accounts (e.g., visual voicemail, instant messaging (IM), etc.). Additionally, navigating between sub-directories or children may be applicable to a variety of content (e.g., contact lists (e.g., friends, business, etc.), music, videos, or other types of multimedia (e.g., playlists, genres, etc.), etc.

Figure 4:
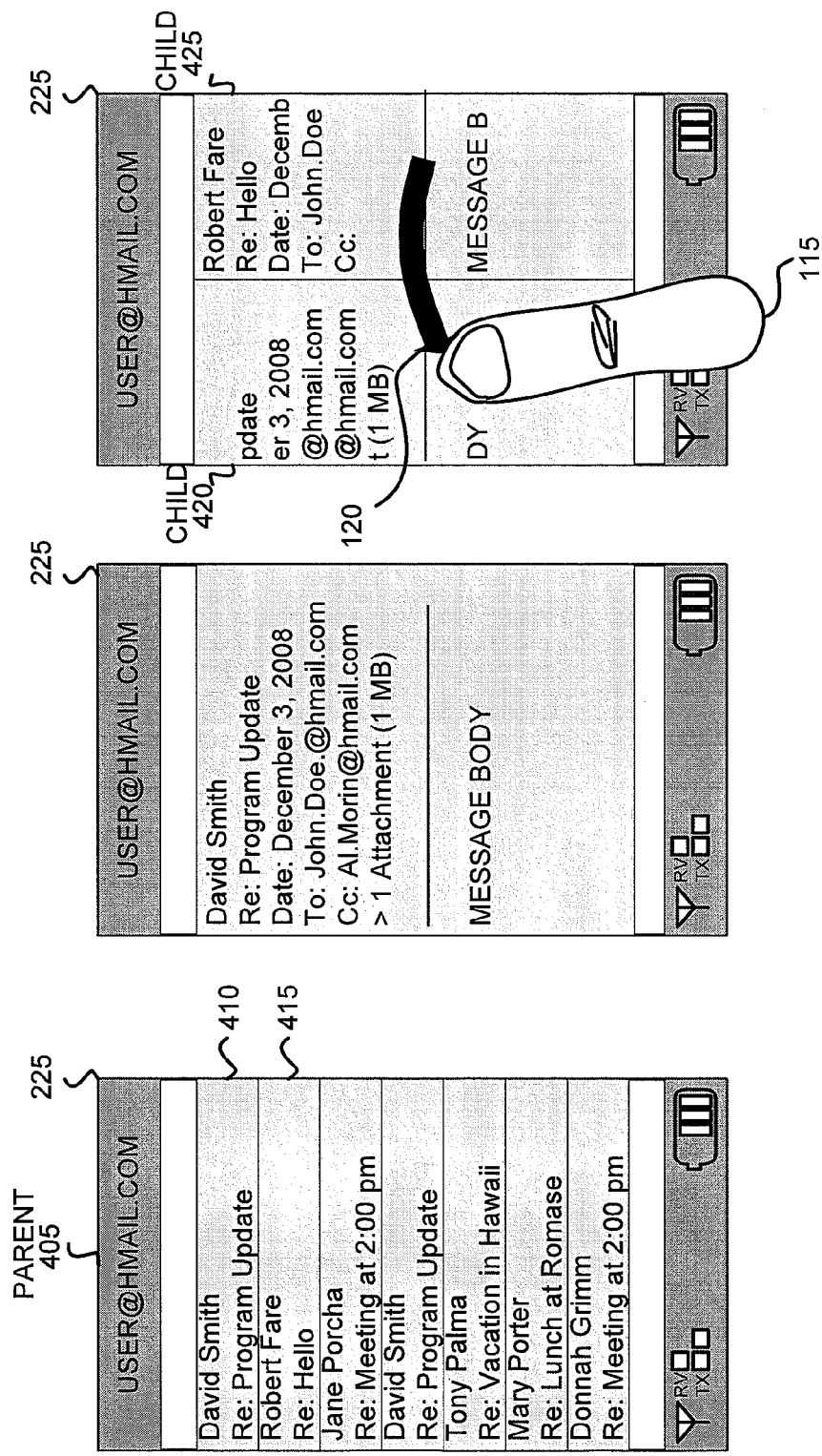
FIGS. 4A-4C are diagrams illustrating a gesture-based navigation according to the concepts described herein.

FIGS. 4A-4C are diagrams illustrating a gesture-based navigation according to the concepts described herein. In FIG. 4A, assume that a user accesses an e-mail account (e.g., user@hmail.com) on display 225 of user device 200. In this example, user@hmail.com email account may correspond to a parent (e.g., as illustrated as parent 405). For purposes of discussion, assume that the user selects an e-mail 410 by touching display 225. FIG. 4B illustrates the content displayed on display 225 after e-mail 410 has been selected.

Turning to FIG. 4C, assume that the user wishes to view e-mail 415. By way of example, user's finger 115 may perform gesture 120 to navigate from e-mail 410 to e-mail 415. In this example, e-mail 410 and e-mail 415 may correspond to a child 420 and child 425, respectively. While gesture 120 is illustrated as a flicking gesture, in other implementations, gesture 120 may correspond to any type of gesture described herein. It will be appreciated, although not illustrated, the user may navigate to subsequent or previous e-mails associated with the user@hmail.com e-mail account, in a similar manner. For example, in a case where a flicking gesture is implemented, the user may review a subsequent e-mail when the flicking gesture is performed in one direction, while the user may review a previous e-mail when the flicking gesture is in another direction (e.g. an opposite direction).

Although FIGS. 4A-4C illustrates an example of a gesture-based navigation according to the concepts described herein, in other implementations, the content may be different. For example, in other instances, the content displayed on display 225 may not include a list of e-mails. Rather, the content on display 225 may include a contact list, a list of photos, videos, or other types of multi-media, visual voicemail messages, etc. It will be appreciated that the navigation demonstrated in FIGS. 4A-4C did not involve a user selecting an icon (e.g., an arrow) to cursor back and forth through the list of e-mails. Rather, the user was able to review previous and subsequent e-mails based on a gesture. In this way, the GUI displayed on display 225 did not have to unnecessarily include an icon or some other type of object to perform the navigation described herein. Additionally, it will be appreciated that the navigation demonstrated in FIGS. 4A-4C did not involve the user having to close one e-mail and open another e-mail. It will be appreciated that in this example, the navigation demonstrated in FIGS. 4A-4C permits a user to navigate between sub-directories or children having the same parent or the same directory. For example, as previously described, the parent may correspond to the e-mail account (e.g., user@hmail.com) and the children or sub-directories may correspond to the e-mails within that e-mail account.

Described below is an exemplary process consistent with the concepts described herein. The process will be described as being performed by user device 200.

Figure 5:
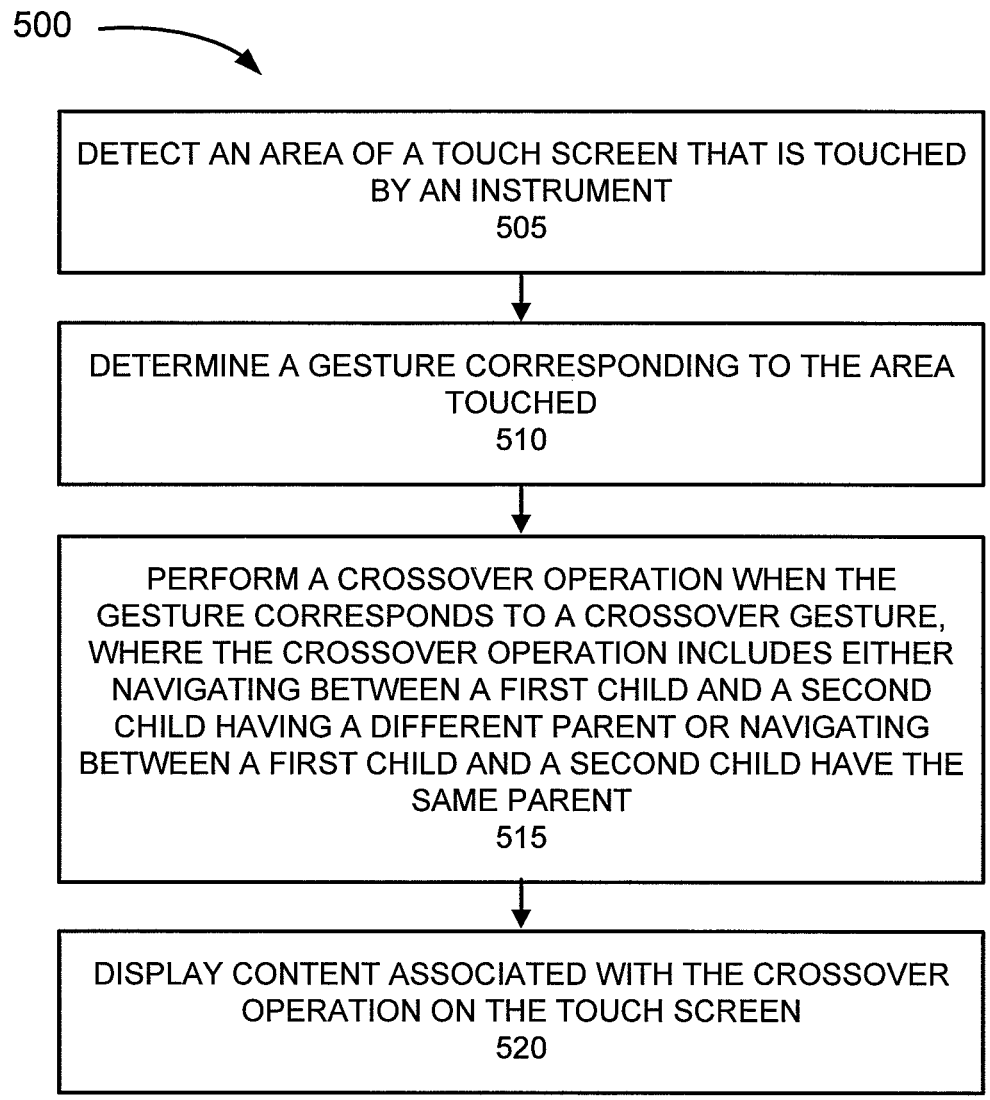
FIG. 5 is a flow diagram illustrating an exemplary process consistent the concepts described herein.

FIG. 5 is a flow diagram illustrating an exemplary process 500 for providing a gesture-based navigation according to the concepts described herein. In addition to FIG. 5, process 400 may be described in reference to other figures.

As previously mentioned, the navigation described herein may be associated with a variety of gestures (e.g., single point, multipoint, etc.). For purposes of discussion, the gesture will be referred to as a crossover gesture. Further, the navigation associated with the crossover gesture will be referred to as a crossover operation.

Process 500 may begin with detecting an area of a touch screen that is touched by an instrument (block 505). Display 225 of user device 200 may detect an area that is touched by an instrument. As previously mentioned, the instrument may include a user's hand, finger(s), a stylus, etc.

A gesture corresponding to the area touched may be determined (block 510). Gesture component 315 may determine a gesture based on the area(s) touched on display 225. A gesture may include a variety of actions, such as, for example, a single-point gesture or a multipoint gesture. Single-point gestures and multipoint gestures may each include, for example, continuous movement gestures (e.g., sliding across display 225), static gestures (e.g., tapping), multi-gestures (e.g., a sequence of strokes), etc.

While it has been described that gesture component 315 may determine a variety of gestures and that a corresponding variety of operations may be performed, for purposes of discussion, process 500 will be described as if the gesture corresponds to a crossover gesture.

A crossover operation may be performed when it is determined that the gesture corresponds to a crossover gesture (block 515). As described herein, a gesture-based navigation may be performed, such as, a crossover operation. In one implementation, the crossover operation may navigate between sub-directories or children associated with different directories or parents. In other implementations, the crossover operation may navigate between sub-directories or children associated with the same directory or the same parent. FIGS. 1A-1C and FIGS. 4A-4C, as previously described and illustrated are examples of such implementations.

It will be appreciated that the crossover gesture corresponding to the example described and illustrated in FIGS. 1A-1C may be the same or different from the crossover gesture corresponding to the example described and illustrated in relation to FIGS. 4A-4C. In this regard, in one embodiment, when the crossover gesture, with respect to FIGS. 1A-1C, is the same as the crossover gesture, with respect to FIGS. 4A-4C, user device 200 (e.g., gesture component 315, processing system 305) may navigate between sub-directories or children associated with different directories or parents, or navigate between sub-directories or children associated with the same directory or the same parent, depending on the content displayed when the touch of display 225 is detected. In another embodiment, when the crossover gesture corresponding to the example described and illustrated in FIGS. 1A-1C is different than the crossover gesture corresponding to the example described and illustrated in FIGS. 4A-4C, user device 200 (e.g., gesture component 315, processing system 305) may navigate (e.g., between children associated with the same parent or different parents) according to a mapping of the distinct crossover gestures.

Content associated with the crossover operation may be displayed on the touch screen (block 520). Display 225 may display the content (e.g., as previously illustrated in FIGS. 1A-1C and FIGS. 4A-4C) corresponding to the crossover operation. By way of example, the user may navigate between sub-directories or children.

Although FIG. 5 illustrates an exemplary process 500, in other implementations, fewer, additional, or different operations may be performed.

According to the concepts described herein, a user device may interpret a user's gesture to permit navigation between sub-directories or children associated with different directories or parents. Additionally, or alternatively, a user device may interpret a user's gesture to permit navigation between sub-directories or children associated the same directory or parent. In this way, a user's interaction with respect to navigating to particular content may be minimized.

The foregoing description of implementations provides illustration, but is not intended to be exhaustive or to limit the implementations to the precise form disclosed. Accordingly, modifications to the concepts, implementations, etc., described herein may be possible. For example, although concepts have been described with respect to a user device including a touch screen or touch-based display, in other implementations, a touchpad or other input device may be utilized to receive the user input (e.g., gesture) to which content may be displayed on a display according to the concepts described herein.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while a series of blocks has been described with regard to the process illustrated in FIG. 5, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
    detecting, by a user device, an input on a display device associated with the user device;
    determining, by the user device, a gesture corresponding to the input detected on the display device; and
    performing, by the user device, an operation when the gesture corresponds to a particular gesture,
        performing the operation including:
            navigating between a first child content and a second child content based on the particular gesture,
                the first child content being accessible via a first parent content that is associated with a first plurality of content, the first child content including a portion of the first plurality of content,
                the first parent content including a first e-mail account and the first child content corresponding to an e-mail message of the first e-mail account,
                the second child content being accessible via a second parent content that is associated with a second plurality of content, the second parent content being different than the first parent content, the second child content including a portion of the second plurality of content,
                the second parent content including a second e-mail account that is different than the first e-mail account,
                the second child content corresponding to an e-mail message of the second e-mail account, and
            navigating between the first child content and the second child content including:
                navigating between the e-mail message of the first e-mail account and the e-mail message of the second e-mail account.

2. The method of claim 1, where detecting the input on the display device includes detecting an input, from a user, on the display device.

3. The method of claim 1, further comprising:
    performing another operation based on another gesture that corresponds to another input detected on the display device,
        performing the other operation including:
            navigating between a third child content and a fourth child content based on the other gesture,
            where the third child content and the fourth child content include at least one of:
                music content,
                video content, or
                multimedia content.

4. The method of claim 1, where the gesture includes at least one of:
    a sliding gesture on the display device,
    a tapping gesture on the display device, or
    a sequence of strokes on the display device.

5. The method of claim 1, further comprising:
    performing, by the user device, another operation when the gesture corresponds to another particular gesture,
    where performing the other operation includes:
        navigating between a third child content and a fourth child content based on the other particular gesture,
        where the third child content and the fourth child content are accessible via a same parent content, and
        where navigating between the third child content and the fourth child content includes:
            providing, for display on the display device, by the user device, another content that includes a portion of the third child content and a portion of the fourth child content.

6. The method of claim 5, where the same parent content corresponds to a third e-mail account, and
    where the third child content and the fourth child content each corresponds to a different one of e-mail messages associated with the third e-mail account,
    the method further comprising:
        providing, for display on the display device, a first one of the e-mail messages corresponding to the third child content,
            where the input, on the display device, is detected after the first one of the e-mail messages is displayed on the display device; and
        providing, for display on the display device, a second one of the mail messages corresponding to the fourth child content after displaying the other content that includes the third child content and the fourth child content.

7. The method of claim 1, further comprising:
    determining a second gesture corresponding to a second input detected on the display device; and
    navigating, based on the second gesture, between a visual voicemail message, of a first visual voicemail account, and a visual voicemail message of a second visual voicemail account.

8. The method of claim 1, further comprising:
detecting a second gesture on the display device;
determining, based on the second gesture, whether to perform a first operation or a second operation,
  the first operation including navigating between a third child content and a fourth child content, the third child content being accessible via a third parent content, the fourth child content being accessible via a fourth parent content, the fourth parent content being different than the third parent content, and
  the second operation including navigating between a fifth child content and a sixth child content, the fifth child content and the sixth child content being accessible via a same parent content,
where determining whether to perform the first operation or the second operation includes:
  determining whether to perform the first operation or the second operation further based on the third child content or the fifth child content; and
performing the first operation or the second operation based on determining whether to perform the first operation or the second operation.

9. A device comprising:
one or more processors to:
  detect an input on an area of a display device,
  determine a gesture corresponding to the input on the area the display device,
  perform an operation when the gesture corresponds to a first gesture,
  when performing the operation, the one or more processors are to:
    navigate between a first child content and a second child content based on the first gesture,
      the first child content being accessible via a first parent content that is associated with a first plurality of content, the first child content including a portion of the first plurality of content,
      the second child content being accessible via a second parent content that is associated with a second plurality of content, the second parent content being different than the first parent content, the second child content including a portion of the second plurality of content,
      the first parent content including a first visual voicemail account,
      the second parent content including a second visual voicemail account that is different than the first visual voicemail account,
      the first child content including a visual voicemail message of the first visual voicemail account,
      the second child content including a visual voicemail message of the second visual voicemail account, and
    when navigating between the first child content and the second child content, the one or more processors are to:
      navigate between the visual voicemail message, of the first visual voicemail account, and the visual voicemail message of the second visual voicemail account.

10. The device of claim 9, where the one or more processors are further to perform another operation based on another gesture that corresponds to another input detected on the display device,
  when performing the other operation, the one or more processors are to:
    navigate between a third child content and a fourth child content based on the other gesture,
    where the third child content and the fourth child content include at least one of:
      music content,
      video content, or
      multimedia content.

11. The device of claim 9, where the one or more processors are further to:
  perform another operation when the gesture corresponds to a second gesture,
  where, when performing the other operation, the one or more processors are to:
    navigate between a third child content and a fourth child content based on the second gesture,
    where the third child content and the fourth child content are accessible via a same parent content.

12. The device of claim 11, where the same parent content includes a list of items, and
  where the third child content and the fourth child content each includes a different item in the list of items.

13. The device of claim 12, where the same parent content corresponds to an e-mail account, and
  where each item, of the list of items, identifies a different e-mail message of the e-mail account.

14. The device of claim 9, where the one or more processors are further to:
  determine a second gesture corresponding to a second input on the area of the display device, and
  navigate, based on the second gesture, between a message, of a first e-mail account, and a message of a second e-mail account,
    the second e-mail account being different than the first e-mail account.

15. The device of claim 9, where the one or more processors are further to:
  detect a second gesture on the area of the display device;
  determine, based on the second gesture, whether to perform a first operation or a second operation,
    when performing the first operation, the one or more processors are to navigate between a third child content and a fourth child content, the third child content being accessible via a third parent content, the fourth child content being accessible via a fourth parent content, the fourth parent content being different that the third parent content, and
    when performing the second operation, the one or more processors are to navigate between a fifth child content and a sixth child content, the fifth child content and the sixth child content being accessible via a same parent content,
    where the one or more processors are to determine whether to perform the first operation or the second operation further based on the third child content or the fifth child content, and
  perform the first operation or the second operation based on determining whether to perform the first operation or the second operation.

16. A non-transitory computer-readable memory storing instructions, the instructions comprising:
  one or more instructions, which when executed by at least one processor of a device, cause the at least one processor to detect an input on a display device associated with the device;

one or more instructions, which when executed by the at least one processor, cause the at least one processor to determine a gesture corresponding to the input detected on the display device; and one or more instructions, which when executed by the at least one processor, cause the at least one processor to perform an operation when the gesture corresponds to a particular gesture, the one or more instructions to perform the operation including:

one or more instructions, which when executed by the at least one processor, cause the at least one processor to navigate between a first child content and a second child content based on the particular gesture, the first child content being accessible via a first parent content that is associated with a first plurality of content, the first child content including a portion of the first plurality of content, the first parent content including a first e-mail account and the first child content corresponding to an e-mail message of the first e-mail account, the second child content being accessible via a second parent content that is associated with a second plurality of content, the second parent content being different than the first parent content, the second child content including a portion of the second plurality of content, the second parent content including a second e-mail account that is different than the first e-mail account, the second child content corresponding to an e-mail message of the second e-mail account, and the one or more instructions to navigate between the first child content and the second child content including:

one or more instructions, which when executed by the at least one processor, cause the at least one processor to navigate between the e-mail message of the first e-mail account and the e-mail message of the second e-mail account.

17. The non-transitory computer-readable memory of claim 16, the instructions further comprising:

one or more instructions, which when executed by the at least one processor, cause the at least one processor to perform another operation based on another gesture that corresponds to another input detected on the display device, the one or more instructions to perform the other operation including:

one or more instructions, which when executed by the at least one processor, cause the at least one processor to navigate between a third child content and a fourth child content based on the other gesture, where the third child content and the fourth child content include at least one of:
music content,
video content, or
multimedia content.

18. The non-transitory computer-readable memory of claim 16, where the gesture includes at least one of:
a sliding gesture on the display device,
a tapping gesture on the display device, or
a sequence of strokes on the display device.

* * * * *